Dec. 19, 1961   E. T. HUNGERFORD ETAL   3,014,177
ELECTROMAGNETIC EARTH SURVEYING APPARATUS
Filed June 24, 1957
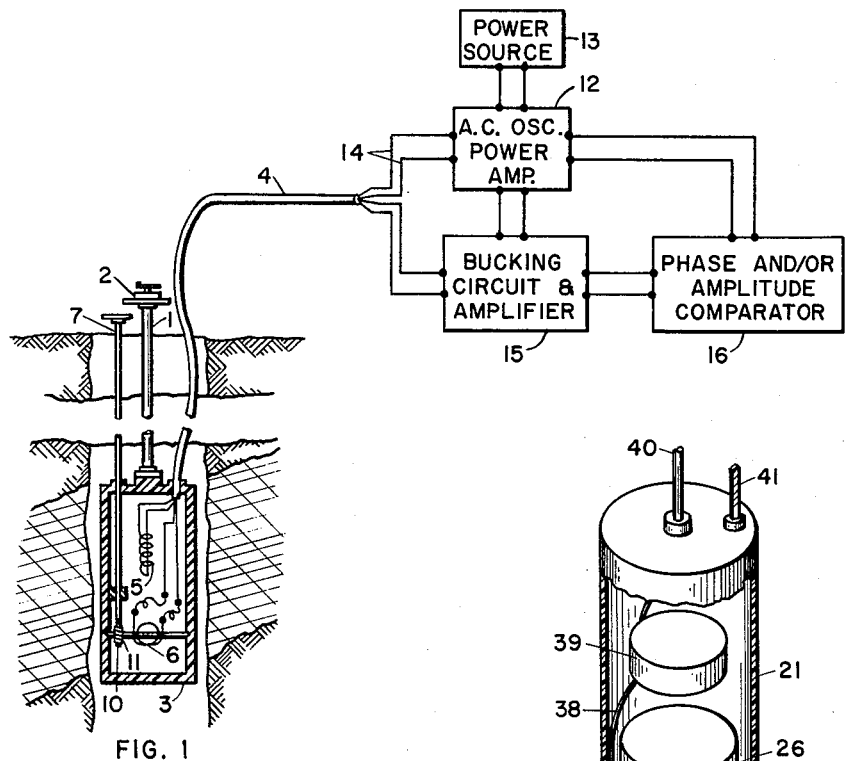
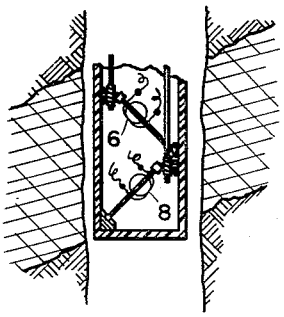
FIG. 1
FIG. 2
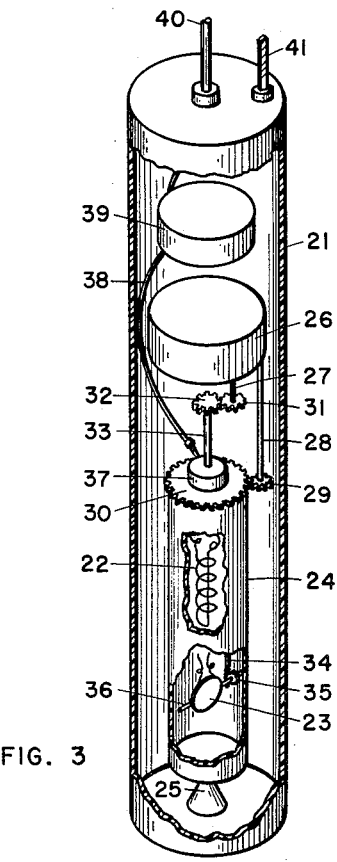
FIG. 3
INVENTORS:
C. H. FAY
E. T. HUNGERFORD
BY: J. H. McCarthy
THEIR AGENT

United States Patent Office

3,014,177
Patented Dec. 19, 1961

3,014,177
ELECTROMAGNETIC EARTH SURVEYING
APPARATUS
Ernest T. Hungerford, Bellaire, and Charles H. Fay, Houston, Tex., assignors to Shell Oil Company, a corporation of Delaware
Filed June 24, 1957, Ser. No. 667,517
15 Claims. (Cl. 324—8)

This invention relates to the determination of the various characteristics of subsurface earth formations and pertains more particularly to a method and apparatus for electromagnetically measuring a quantity indicative of the dip direction and/or the dip magnitude of formations traversed by a well borehole of determinable orientation.

The three presently known types of dipmeters are the self-potential dipmeter, the resistivity dipmeter, and the microlog dipmeter. Numerous tests run with these instruments indicate that they are reliable under normal conditions where the dip of the formation is greater than 10°, while if the surveying conditions are very favorable, dips of from 2° to 10° may usually be determined.

It is an object of the present invention to provide an apparatus adapted to measure accurately under most conditions dipping formations wherein the dip may approach 0°.

A further object of this invention is to provide an apparatus adapted to measure accurately dipping formations traversed by a small diameter borehole which may have irregular walls.

Another object of this invention is to provide a dipmeter adapted to measure accurately dipping formations traversed by an inclined borehole.

A still further object of the present invention is to provide a dipmeter apparatus having instantaneous response adapted to produce an electromagnetic field extending a substantial distance into the formation whereby any error due to borehole irregularities is minimized.

It is also an object of the present invention to provide a logging tool adapted to measure the resistivity of formations traversed by a well borehole.

These and other objects of this invention will be understood from the following description taken with reference to the attached drawing, wherein:

FIGURE 1 is a schematic view diagrammatically illustrating one form of the present dipmeter positioned in a well borehole;

FIGURE 2 is a diagrammatic view illustrating another form of detector coil adapted to be used with the dipmeter of FIGURE 1.

FIGURE 3 is a diagrammatic view illustrating one specific form of the down hole tool.

In the method of the present invention, a source field is created within the borehole by placing electromagnetic field generating means, such as a solenoid element or elements, down a borehole in known alignment therewith and energizing this generating means, comprising the solenoid, to produce an alternating electromagnetic field, some of which penetrates the surrounding formation. The portion of the generated source field that penetrates the formation is known as the linkage field. In strata possessing a resistivity anisotropy, which is primarily due to bedding within the strata, the linkage field produces eddy-current loops, the average plane of which tends to coincide with that of the bedding plane of the strata. The eddy-current loops produce or are equivalent to, an alternating electromagnetic field in the formation known hereinafter as a "formation field" which is perpendicular to the average plane of the loops.

The degree to which the average plane of the eddy-current loops tends to coincide with that of the bedding plane of the strata depends upon the degree of resistivity anisotropy present. Thus, the average plane of the eddy-current loops is tilted from the horizontal into the plane of the dipping formation where there is an existing resistivity anisotropy. The resistive anisotropy is due to bedding, occurring when the formation was originally laid down. The resistivity is smaller in a direction parallel to the bedding plane than it is in a direction perpendicular to the bedding plane.

The method of the present invention further contemplates the detecting of an electrical signal responsive to the direction of the formation field by placing within the well borehole, in known alignment with the solenoid means or other means of producing the source field, an adjustable directional detector coil element or detector coil system capable of being arranged to pick up a formation signal from a formation field whose direction is divergent from that of the source field. The formation field signal picked up by the detector coil system, i.e., the voltage induced in the detector coil, varies in response to variations between the alignment of the effective axis of the detector coil system and the axis of the formation field.

The angular position or alignment between the effective axis of the detector coil system and the formation field can be measured, for instance, by moving or altering the effective axis of the detector coil system to positions of known alignment with the solenoid means or other means for producing the source field. In these new positions of known alignment with the source field, the signal pickup by the detector coil system is characteristic of the angular position or alignment between the detector coil system and the formation field. The arrival of the detector coil system in a determinable alignment with the formation field may be determined and/or recorded by means of the response of suitable electronic circuits, such as amplifiers, phase detectors, and associated recording circuits, adapted to detect the produced signals therein, which include signal variations in both phase and amplitude.

A variety of equipment, instrumentation, and procedures may be employed in practicing the method of the present invention. In order to facilitate description of the present method it will be described hereinbelow with regard to the simplest form of equipment which could be used to practice the method of electromagnetically determining the dip of sloping formations traversed by a borehole. The equipment to be used is of a size that is readily lowerable into a well borehole at the lower end of an elongated rod, tubular member or cable together with means for lowering the apparatus into a well and withdrawing it therefrom. For shallow depths a plurality of loading poles fixedly secured together can be used.

As shown in FIGURE 1 of the drawing, the simplest form of the apparatus comprises an elongated rod 1 having an azimuth or direction indicating device 2 at the upper end thereof, and a coil-supporting frame or housing 3. The rod 1 may also be employed to support a cable 4 which electrically connects coils 5 and 6 carried by frame 3 to the circuit elements of the instrument positioned at the surface in the vicinity of the borehole. Fixedly positioned within the frame 3 is a source coil 5, which may for example be similar to a solenoid coil.

The detector coil 6 is mounted within frame 3 in fixed space relationship from coil 5 while at the same time being mounted for rotation about a horizontal and/or a vertical axis. In order to rotate the detector coil 6 about a vertical axis, it is preferably rotated together with the source coil 5 and frame 3 so that the two coils are accurately aligned at all times. If desired, however, rotation of the detector coil about a vertical axis may be carried out while the source coil 5 remains stationary if suitable alignment between the two coils is maintained. The detector coil system may also be effectively rotated when at least two detector coils are used by proper phasing and amplitude control of the detected signals.

The source coil 5 and the detector coil 6 are held in known alignment with each other, and with the borehole in which they are positioned, by means of the supporting rod 1 and an adjusting rod 7, which is secured to the frame 3 so that the detector coil 6 may be rotated therein. The adjusting rod 7 may be connected to the detector coil 6 in any suitable manner, as by gears 10 and 11 which intermesh so that the detector coil 6 may be rotated about a horizontal axis to a position where there is minimum direct signal pickup from the source coil 5.

The source coil 5 may be energized with an alternating current supplied from the surface by an A.C. oscillator 12 and a power source 13 through leads 14 so that the resulting alternating magnetic field produced by the source coil penetrates the surrounding formation. The total signal received by the detector coil 6 is fed via cable 4 through compensating and amplifying circuits 15 to a phase and/or amplitude comparator 16. The total signal received by the detector coil 6 may comprise two portions; one portion of which is the formation signal (that signal detected as a result of the induced formation field); the other portion being the direct signal, that is a signal which is picked up directly from the electromagnetic field generator means. The direct signal, when it exists, can be caused by misalignment of the source coil system and the detector coil system, and is an unwanted signal. Thus, in the event that a direct signal exists, bucking or compensating circuits may be employed, if necessary, to reduce the direct signal pickup from the source coil to a suitable minimum level. As the now fixedly positioned detector coil 6 is rotated about a vertical axis by turning rod 1, the signal picked up or detected from a formation field, which is divergent from the source field, varies in amplitude as the effective axis of the pickup coil rotates through a single revolution with respect to the direction of the formation field. If there is no dip to the formation, there would be no divergence between the formation field and the source field in a vertical borehole. In addition to a variation in amplitude on rotation of the detector coil 6, there is an abrupt relative phase change which occurs at the time of rotation when the effective coil axis and the formation field are perpendicular to each other.

In a preferred manner of practicing the present invention, the direction of the formation field relative to the effective axis of the detector coil 6 is measured by observing or recording from the azimuth indicating device 2 the position of the detector coil 6 when there is an abrupt phase change or a phase reversal of the detected signal.

In the schematic arrangement shown in FIGURE 1 of the drawing, the detector coil 6 is rotated about a vertical axis by turning support rod 1. The reversal of phase occurs when the effective axis of the coil 6 is normal to the formation field. The formation field is perpendicular to the average plane of the eddy-current loops. The eddy-current loops in turn tend to lie in the bedding plane of the formation, it being assumed that there is an appreciable degree of resistivity anisotropy present. Thus, the direction of dip of the underlying formation, i.e., the azimuth direction of up or down dip, can be determined by noting the direction indicated on the azimuth indicating device 2 when an abrupt phase change or a phase reversal occurs on the phase detector 16. In the event that it is desired to provide a permanent record of the azimuth direction at the time of abrupt phase change or phase reversal, any suitable type of recording mechanism, such as a camera, may be mounted above the azimuth indicating device 2 to record or otherwise indicate the setting of the indicating means 2 when phase reversal takes place. Such a recording or indicating device would be electrically connected to the phase detector and comparator 16 and be actuated thereby each time an abrupt phase change or a phase reversal occurs.

In addition to determining the direction of dip by the abovedescribed method, the magnitude of dip can be determined by noting the amplitude of the formation signal received on the amplitude detector 16, in the event that the formation resistivity and resistivity anisotropy characteristics are known or have been determined. In the event that these characteristics are not known, the magnitude of the dip or the dip angle of any formation may be determined in a similar manner wherein the detecting coil system 6 is adapted to be rotated about two axes, or a pair of detecting coil systems are adapted to be rotated each about a different axis. When two coils are employed, the coils are preferably positioned to rotate about the same vertical axis when they are perpendicular to each other, but this is not essential to the satisfactory operation of the system.

For example, the magnitude of dip can be determined by adding a second detector coil 8 as shown in FIGURE 2 of the drawing. Preferably, both coils 6 and 8 are provided with means for zero adjustment or for positioning the detector coils so that there is minimum direct signal pickup from the source coil 5. This adjustment would be made in a manner similar to that described with regard to FIGURE 1 wherein coil 6 may be rotated about a horizontal axis and vertically positioned with the borehole, by means of adjusting rod 7. Both detector coils 6 and 8 are also mounted to rotate either together or independently about an axis perpendicular to the borehole axis. Signals received from the two detector coils 6 and 8 would be observed or recorded on the phase and amplitude detector 16. The received signals are also a measure of the resistivity of the formations.

A measurement of the direction and magnitude of dip of subsurface formations would be as follows. With the effective axis of detector coil 6, for example, in position for minimum direct pickup from the source coil, the support 1 and azimuth indicating device 2 are turned until a signal phase reversal is indicated on the phase detector 16 whereby the dip azimuth would be determined from the setting of the azimuth indicating device 2. The support 1 and its azimuth indicating device 2 would then be turned 90° so that the effective face of the coil 6 is perpendicular to the formation field.

Then, by means of rod 7, the two detector coils 6 and 8 are rotated about an axis perpendicular to the borehole until they reach a position in which the effective axis of one or the other of the two coils is perpendicular to the formation field, at which time, a phase reversal occurs in the signal picked up by that coil. The purpose of the second coil then is to compensate or buck out the direct signal from the source coil 5 or to maintain the direct signal pickup below some minimum level so that the formation signal may be detected. The second coil 8 may be displaced axially from coil 6 or may be omitted entirely. In the latter case, a suitable bucking or compensating signal may be generated to maintain the direct signal pickup below some minimum level as previously described with regard to FIGURE 1, for example, by employing a suitably driven sinusoidal potentiometer to generate a suitable compensating signal.

The means 5 for producing a source electromagnetic field can comprise one or a plurality of solenoids mounted in a well logging sonde. If more than one solenoid is used, they may be displaced axially of each other. This equipment may comprise solenoids with or without cores and can be stationary in respect to the sonde or adjustable or rotated together with a mechanically-rotated directional pickup coil element or elements.

The movement or adjustment of the directional pickup coil element 6, or 6 and 8, can be either a mechanical motion or an electrical equivalent thereof. The motion can be continuous, discontinuous, or an oscillating motion. Where the drive of the pickup coil is mechanical, as in the case of the instrument above-described, the pickup coil element 6 preferably comprises a flat coil mounted with its axis substantially normal to the axis of the solenoid and rotated with the solenoid about a common axis, i.e., the instrument axis. Where the sweeping motion or drive of the pickup coil is electrical, the pickup coil element preferably comprises flat coils which may or may not be identical or "matched," whose axes are in different directions. The effective axis of the coil system is electrically swept about the axis of the source field by proper phasing and amplitude adjustment of the signals received in the respective coils. This may be done for instance with the use of a suitable modulating circuit. To those familiar with the art, it will be apparent that by modulating the two received signals with proper phasing, the two-coil system may be made effectively to rotate and to produce a signal substantially the same as would be observed from a single coil rotating about a vertical axis. In the appended claims the detector coil means are described as being adjustable, which term includes the mechanical movement of the coil system or the electrical equivalent thereof.

In either case, the tendency of the pickup coil element to receive a signal from the source field is preferably reduced by suitable electromagnetic shielding devices, for example, a shielding device such as a shorted-turn coil. In addition, bucking or compensating circuits are preferably used to negate direct pickup of the source field. Additionally, the pickup coils may be surrounded by an electrostatic shielding, for example, a shielding device such as a series of separately installed parallel wires in the form of a squirrel cage, or one of the other shielding devices commonly employed as electrostatic shields. Since these shielding devices do not constitute part of the present invention, they will not be further described, since they are well known to the art.

The geometric orientation of the sonde containing the source solenoid element can be obtained by separately or concurrently determining the orientation of the borehole and/or the orientation of the sonde by means of conventional borehole-orienting devices and devices for determining the position of a sonde within a borehole.

In FIGURE 3 of the drawing, an instrument is shown comprising a casing 21 having mounted therein a source coil 22 and a detector coil 23 which are mounted in an inner cylinder 24 which is positioned for rotation within the housing or casing 21 on a pivot 25.

Motor means 26 are diagrammatically shown as being mounted within the housing 21, the motor means being equipped to drive the pair of shafts 27 and 28. Shaft 28 is adapted to rotate inner cylinder 24 through gears 29 and 30. In a like manner the rotation of shaft 27 drives gears 31 and 32 to rotate shaft 33 which extends into the inner cylinder 24 and is provided with suitable gears (not shown) to rotate adjusting shaft 34 which meshes with gear 35 to rotate a horizontally-positioned shaft 36 supporting the detector coil 23. While running a continuous dipmeter log of a borehole the motor means continuously adjusts and rotates the detector coil 23. It is apparent that the coil system of FIGURE 2 may be substituted for coil 23 of FIGURE 3.

Power is supplied to the source coil 22 and signals are transmitted from the detector coil 23 through a slip ring assembly 37 surrounding shaft 33 and thence through electrical leads 38 to suitable electronic circuits such as an oscillator, power amplifier, signal amplifier, bucking circuits, etc. which are all contained in a readily removable capsule 39 within the top of the housing 21. Signals from this capsule 39 are transmitted to the surface through a suitable instrument cable 40. In addition, any orienting device well known to the art may also be contained within the housing 21. If it is desired to employ a loading pole to determine instrument orientation in the well, the loading pole 41 is fixedly secured to the top of the case or housing 21 as illustrated.

We claim as our invention:

1. An electromagnetic device for use in determining characteristics of earth formations traversed by a well borehole, said device comprising alternating electromagnetic field generator means consisting of at least one solenoid for generating an electromagnetic field which induces eddy current loops substantially in the bedding planes of a portion of the formation adjacent the borehole, detector coil means positioned in fixed spaced relationship to said solenoid generator means for movement with said generator means through said borehole, said detector coil means being adjustable at least about the axis of said solenoid generator means, azimuth indicating means operatively connected to said detector coil means for indicating the azimuth of the detector coil as it is turned about said axis, and electrical circuit means for detecting and indicating the signal induced in said detector coil means by an electromagnetic field.

2. An electromagnetic dipmeter for use in determining the dip of earth formations traversed by a well borehole, said dipmeter comprising alternating electromagnetic field generator means consisting of at least one solenoid for generating an electromagnetic field which induces eddy current loops substantially in the bedding planes of a portion of the formation adjacent the borehole, detector coil means positioned in spaced relationship to said solenoid generator means for movement with said generator means through said borehole to a fixed position therein, said detector coil means being mounted for movement about the axis of said solenoid generator means and an axis substantially normal thereto, remote control means connected to said detector coil means and operable from the surface adjacent said well for turning said detector coil means about said axes, azimuth indicating means operatively connected to said detector coil means for indicating the azimuth of the detector coil as it is turned about said solenoid generator means axis, and electrical circuit means for detecting and indicating the signal received by said detector coil means.

3. An electromagnetic dipmeter for use in determining the dip of earth formations traversed by a well borehole, said dipmeter comprising a housing, means for lowering said housing into a well borehole, alternating electromagnetic field generator means consisting of at least one solenoid mounted in said housing for generating an electromagnetic field which induces eddy current loops substantially in the bedding planes of a portion of the formation adjacent the borehole, detector coil means positioned in said housing in spaced relationship to said solenoid generator means for movement through said borehole to a fixed position therein, said detector coil means being adjustable at least about the axis of said solenoid generator means, azimuth indicating means operatively connected to said detector coil means for indicating at the surface the azimuth of the detector coil as it is turned about said axis, and electrical circuit means including means at the surface for detecting and indicating the phase and amplitude of a voltage induced in said detector coil means by an electromagnetic field.

4. A method of determining a characteristic of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting a characteristic of the voltage induced in said coil, scanning a portion of the produced formation field in a horizontal plane by turning the effective axis of said coil on a substantially vertical axis, and measuring said voltage characteristic to obtain a measure of the formation characteristic.

5. A method as defined in claim 4 in which the alternating electromagnetic field is created by generator means positioned in said borehole in spaced relationship with said detector coil.

6. A method of determining a characteristic of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting the voltage induced in said coil, scanning a portion of the produced formation field in a horizontal plane by turning the effective axis of said coil on a substantially vertical axis, and measuring said voltage to obtain a measure of the formation characteristic.

7. A method as defined in claim 6 including the step of eliminating any direct signal from said generator means picked up by said detector coil by turning on an axis substantially normal to the axis of the generator means one of a pair of coils to a position such that the direct signal picked up by said coil substantially eliminates the direct signal picked up by the other of said coils.

8. A method of determining the dip of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting a characteristic of the voltage induced in said coil, scanning a portion of the produced formation field in a horizontal plane by turning the effective axis of said coil on a substantially vertical axis, and measuring said voltage characteristic to obtain a measure of the formation dip.

9. A method of determining the dip of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting the phase of the voltage induced in said coil, scanning a portion of the produced formation field in a horizontal plane by turning the effective axis of said coil on a substantially vertical axis at least until an abrupt phase change occurs, and detecting and indicating the directional orientation of said coil at the phase change.

10. A method of determining the dip of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting the amplitude of the voltage induced in said coil, scanning a portion of the produced formation field in a horizontal plane by turning the effective axis of said coil on a substantially vertical axis, and detecting and indicating the directional orientation of said coil at varying amplitudes.

11. A method of determining the resistivity of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting the voltage induced in said coil, scanning a portion of the produced formation field in a horizontal plane by turning the effective axis of said coil on a substantially vertical axis, and measuring said voltage to obtain a measure of the formation resistivity.

12. A method of determining a characteristic of earth formations traversed by a well borehole comprising subjecting a zone of the strata surrounding said borehole to an alternating electromagnetic field generated within the well borehole at a level opposite said zone and with an axis substantially parallel to said borehole to induce eddy current loops the effective planes of which are substantially in the bedding planes of strata possessing a resistivity anisotropy whereby an electromagnetic formation field is produced, maintaining at least one detector coil in the borehole at a level that is within the zone of the strata surrounding the borehole in which the electromagnetic formation field is created, detecting the phase of the voltage induced in said coil, scanning a portion of the produced formation field in a horizontal plane by turning the effective axis of said coil on a substantially vertical axis until a phase reversal occurs, detecting the maximum amplitude of the voltage induced in said coil, and detecting and indicating the directional orientation of said coil at the phase reversal and maximum amplitude of said voltage.

13. A method of measuring a direction corresponding to the dip of an earth formation which is traversed by a borehole of a well, said method comprising the steps of radiating an alternating electromagnetic source field from a field generating means which generating means is inductively coupled to the materials around the borehole and is arranged to create said source field whose axis is directed along a line substantially paralleling the borehole axis, positioning the field generating means in a zone in which the borehole is surrounded by an earth formation which contains a resistive anisotropy substantially paralleling bedding planes and contains bedding planes which are inclined relative to the borehole axis, and selectively measuring at least one component of the direction of an alternating electromagnetic formation field which is directed along a line substantially perpendicular to the bedding planes of the formation.

14. The method of claim 13 in which the components of the direction of the alternating electromagnetic field produced by the alternations of the source field within the surrounding formation is measured by maintaining at least one directionally sensitive detector coil means within the zone in which the source field is created, directing the maximum sensitivity of the detector coil means in a plurality of measured directions divergent from the direction of the source field, and measuring the variations that occur in the voltages which are induced in the detector coil means when its maximum sensitivity is directed in different directions.

15. The method of claim 14 in which the variations that occur in the voltages which are induced in the detector coil means when its direction maximum sensitivity is directed in different directions are measured by detecting the phase of the voltage and detecting the adjacent directions in which there is an abrupt phase change.

References Cited in the file of this patent

UNITED STATES PATENTS

| | | |
|---|---|---|
| 1,980,100 | Schlumberger | Nov. 6, 1934 |
| 2,291,692 | Cloud | Aug. 4, 1942 |
| 2,359,894 | Brown | Oct. 10, 1944 |
| 2,401,280 | Walstrom | May 28, 1946 |
| 2,564,018 | Malmqvist | Aug. 14, 1951 |
| 2,611,190 | MacCallum | Sept. 23, 1952 |
| 2,674,049 | James | Apr. 6, 1954 |
| 2,687,507 | Schonstedt | Aug. 24, 1954 |
| 2,723,374 | Williams | Nov. 8, 1955 |
| 2,766,426 | Wilhelm | Oct. 9, 1956 |